US012754282B2

(12) United States Patent
Jeon et al.

(10) Patent No.: US 12,754,282 B2
(45) Date of Patent: Oct. 6, 2026

(54) RECEIVER OF AN UWB RADAR DEVICE AND OPERATING METHOD THEREOF

(71) Applicant: ELECTRONICS AND TELECOMMUNICATIONS RESEARCH INSTITUTE, Daejeon (KR)

(72) Inventors: Young-deuk Jeon, Daejeon (KR); Yi-Gyeong Kim, Daejeon (KR); Kyung Hwan Park, Daejeon (KR); Sujin Park, Daejeon (KR); Min-Hyung Cho, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 228 days.

(21) Appl. No.: 18/788,357

(22) Filed: Jul. 30, 2024

(65) Prior Publication Data

US 2025/0052860 A1 Feb. 13, 2025

(30) Foreign Application Priority Data

Aug. 11, 2023 (KR) ........................ 10-2023-0105794
Jul. 5, 2024 (KR) ........................ 10-2024-0089133

(51) Int. Cl.
*G01S 7/32* (2006.01)
*G01S 7/292* (2006.01)
(Continued)

(52) U.S. Cl.
CPC ................ *G01S 7/32* (2013.01); *G01S 13/16* (2013.01); *G01S 7/2926* (2013.01); *G01S 13/0209* (2013.01)

(58) Field of Classification Search
None
See application file for complete search history.

(56) References Cited

U.S. PATENT DOCUMENTS 6,195,032 B1 2/2001 Watson et al.
9,121,925 B2 9/2015 Kim
(Continued)

FOREIGN PATENT DOCUMENTS

CN 110445353 A * 11/2019 ............. H02M 1/14
EP 2045617 A1 4/2009

OTHER PUBLICATIONS

Machine translation of CN-110445333-A (Year: 2022).*
(Continued)

*Primary Examiner* — Vladimir Magloire
*Assistant Examiner* — Anna K. Gosling
(74) *Attorney, Agent, or Firm* — LRK PATENT LAW FIRM

(57) ABSTRACT

Disclosed is a receiver of a radar device, which includes a sampling circuit that receives a reflected pulse signal having a first period reflected from a detection target and samples the reflected pulse signal as a first received signal in response to a clock signal having a second period equal to the first period, an integration circuit that, in response to the clock signal, generates an analog integration signal based on the first received signal and a control signal, a comparison circuit that, in response to the clock signal, adjusts a count value and the control signal based on a result of comparing the analog integration signal with a reference signal and outputs the control signal to the integration circuit, and an ADC circuit that converts the analog integration signal into a digital integration signal.

20 Claims, 6 Drawing Sheets

(51) Int. Cl.
*G01S 13/02* (2006.01)
*G01S 13/16* (2006.01)

(56) References Cited

U.S. PATENT DOCUMENTS

| | | | | |
|---|---|---|---|---|
| 11,218,959 | B2 | 1/2022 | Nabki et al. | |
| 11,506,765 | B2 * | 11/2022 | Calder | G01S 7/4863 |
| 11,520,005 | B2 * | 12/2022 | Park | G01S 7/2926 |
| 2003/0128776 | A1 | 7/2003 | Rawlins et al. | |
| 2009/0201195 | A1 | 8/2009 | Gazelle et al. | |
| 2010/0109925 | A1 | 5/2010 | Vampola et al. | |
| 2014/0145759 | A1 | 5/2014 | Tsividis et al. | |
| 2019/0173479 | A1 * | 6/2019 | Dyachenko | H03M 1/0641 |
| 2023/0168339 | A1 | 6/2023 | Kim et al. | |

OTHER PUBLICATIONS

Ta-Shun Chu et al., "A Short-Range UWB Impulse-Radio CMOS Sensor for Human Feature Detection", ISSCC 2011, Session 16, mm-Wave Design Techniques, 16.9, Feb. 22, 2011.

* cited by examiner

RECEIVER OF AN UWB RADAR DEVICE AND OPERATING METHOD THEREOF

CROSS-REFERENCE TO RELATED APPLICATIONS

This application claims priority under 35 U.S.C. § 119 to Korean Patent Application Nos. 10-2023-0105794 filed on Aug. 11, 2023, and 10-2024-0089133 filed on Jul. 5, 2024, in the Korean Intellectual Property Office, the disclosures of which are incorporated by reference herein in their entireties.

BACKGROUND

1. Field of the Invention

Embodiments of the present disclosure described herein relate to a receiver of a radar device, and more particularly, relate to the receiver of the radar device with improved performance and a method of operating the receiver of the radar device.

2. Description of Related Art

UWB radar devices may detect objects based on a transmission and a reception of very short pulses. UWB radar devices may radiate a transmission pulse signal to reach a detection target. The UWB radar devices may receive a reflected pulse signal (or a received pulse signal) generated by the detection target reflecting the transmission pulse signal, and may detect the detection target based on the reflected pulse signal.

A receiver of the UWB radar device may generate data associated with the detection target in response to a clock signal using a method in which a sampler samples a received reflected pulse signal and an integrator integrates the sampled reflected pulse signal. As offsets may occur during the sampling process of the sampler and the number of integrations of the integrator increases, the offsets are accumulated in the output of the integrator, causing the output of the integrator to become saturated. Accordingly, the number of integrations of the integrator may be limited.

SUMMARY

Embodiments of the present disclosure provide a receiver of a UWB radar and a method of operating the same, in which the output of the integrator is maintained within a specific range to solve the above-mentioned problems.

According to an embodiment of the present disclosure, a receiver of a radar device includes a sampling circuit that receives a reflected pulse signal having a first period reflected from a detection target and samples the reflected pulse signal as a first received signal in response to a clock signal having a second period equal to the first period, an integration circuit that, in response to the clock signal, generates an analog integration signal based on the first received signal and a control signal, a comparison circuit that, in response to the clock signal, adjusts a count value and the control signal based on a result of comparing the analog integration signal with a reference signal and outputs the control signal to the integration circuit, and an ADC circuit that converts the analog integration signal into a digital integration signal.

According to an embodiment, when the analog integration signal is less than the reference signal, the comparison circuit may maintain the count value and may initialize the control signal, and when the analog integration signal is greater than or equal to the reference signal, the comparison circuit may adjust the count value to increase and may adjust the control signal to the reference signal.

According to an embodiment, the comparison circuit may include a comparator that generates a comparison signal by comparing the analog integration signal with the reference signal in response to the clock signal, a DAC that adjusts the control signal based on the comparison signal, and a counter that adjusts the count value based on the comparison signal.

According to an embodiment, when the analog integration signal is less than the reference signal, the comparator may generate the comparison signal with a value of logical low (or logic “0”), and when the analog integration signal is greater than or equal to the reference signal, the comparator may generate the comparison signal with a value of logical high (or logic “1”).

According to an embodiment, the counter may maintain the count value when the comparison signal is the logical low, and may adjust to increase the count value when the comparison signal is the logical high.

According to an embodiment, the DAC may initialize the control signal when the comparison signal is the logical low, and may adjust the control signal to the reference signal when the comparison signal is the logical high.

According to an embodiment, the integration circuit may generate the analog integration signal by integrating a signal obtained by subtracting the control signal from the first received signal.

According to an embodiment, the integration circuit may include an operator that generates a second received signal obtained by subtracting the control signal from the first received signal in response to the clock signal, and an analog integrator that generates the analog integration signal by integrating the second received signal in response to the clock signal.

According to an embodiment, the count value may be implemented as an M-bit digital signal, and the analog integration signal may be implemented as an L-bit digital signal, each of the “M” and the “L” may be an arbitrary integer greater than or equal to “0”, and the comparison circuit and the ADC circuit may output the count value and the digital integration signal to a processor, respectively.

According to an embodiment, the processor may place the count value in an MSB and may place the analog integration signal in a LSB to obtain a voltage corresponding to the reflected pulse signal.

According to an embodiment, the processor may obtain the voltage corresponding to the reflected pulse signal based on 0.5 bit overlap technique.

According to an embodiment of the present disclosure, a method of operating a receiver of a radar device, includes receiving, by the receiver of the radar device, a reflected pulse signal having a first period from an outside, sampling, by a sampling circuit, the reflected pulse signal as a first received signal in response to a clock signal having a second period equal to the first period, generating, by an integration circuit, an analog integration signal based on the first received signal and a control signal, in response to the clock signal, comparing, by a comparison circuit, a magnitude of the analog integration signal with a magnitude of a reference signal, in response to the clock signal, adjusting, by the comparison circuit, a count value and the control signal based on a result of comparing the magnitude of the analog integration signal with the magnitude of the reference signal, and converting, by an ADC circuit, the analog integration signal into a digital integration signal.

According to an embodiment, the adjusting of the count value and the control signal may include maintaining the count value and adjusting the control signal to "0" when the analog integration signal is less than the reference signal, and adjusting the count value to increase by "1" and adjusting the control signal to the reference signal when the analog integration signal is greater than or equal to the reference signal.

According to an embodiment, the comparing of the magnitude of the analog integration signal with the magnitude of the reference signal may include generating, by a comparator, a comparison signal by comparing the analog integration signal with the reference signal in response to the clock signal, adjusting, by a DAC, the control signal based on the comparison signal, and adjusting, by a counter, the count value based on the comparison signal.

According to an embodiment, the adjusting of the count value and the control signal may further include generating, by the comparator, the comparison signal with a value of logical low (or logic "0") when the analog integration signal is less than the reference signal, and generating, by the comparator, the comparison signal with a value of logical high (or logic "1") when the analog integration signal is greater than or equal to the reference signal.

According to an embodiment, the adjusting of the count value may include maintaining the count value when the comparison signal is the logical low, and adjusting the count value to increase by "1" when the comparison signal is the logical high.

According to an embodiment, the adjusting of, by the DAC, the control signal based on the comparison signal may include adjusting the control signal to "0" when the comparison signal is the logical low, and adjusting the control signal to the reference signal when the comparison signal is the logical high.

According to an embodiment, the generating of analog integration signal may include integrating a signal obtained by subtracting the control signal from the first received signal.

According to an embodiment, the generating of the analog integration signal may include generating, by an operator, a second received signal obtained by subtracting the control signal from the first received signal in response to the clock signal, and generating, by an analog integrator, the analog integration signal by integrating the second received signal in response to the clock signal.

According to an embodiment of the present disclosure, a radar device includes a receiver that receives a reflected pulse signal having a first period reflected from a detection target, and a processor that controls the receiver and receives data associated with the detection target from the receiver, and the receiver includes a sampling circuit that samples the reflected pulse signal as a first received signal in response to a clock signal having a second period equal to the first period, an integration circuit that, in response to the clock signal, generates an analog integration signal based on the first received signal and a control signal, a comparison circuit that, in response to the clock signal, adjusts a count value and the control signal based on a result of comparing the analog integration signal with a reference signal, outputs the control signal to the integration circuit, and outputs the count value to the processor, and an ADC circuit that converts the analog integration signal into a digital integration signal, and outputs the digital integration signal to the processor, and the count value is implemented as an M-bit digital signal, and the analog integration signal is implemented as an L-bit digital signal, each of the "M" and the "L" is an arbitrary integer greater than or equal to "0", and the processor places the count value in an MSB and places the analog integration signal in a LSB to obtain a voltage corresponding to the reflected pulse signal.

BRIEF DESCRIPTION OF THE DRAWINGS

The above and other objects and features of the present disclosure will become apparent by describing in detail embodiments thereof with reference to the accompanying drawings.

DETAILED DESCRIPTION

Hereinafter, embodiments of the present disclosure will be described in detail and clearly to such an extent that an ordinary one in the art easily implements the present disclosure.

Figure 1:
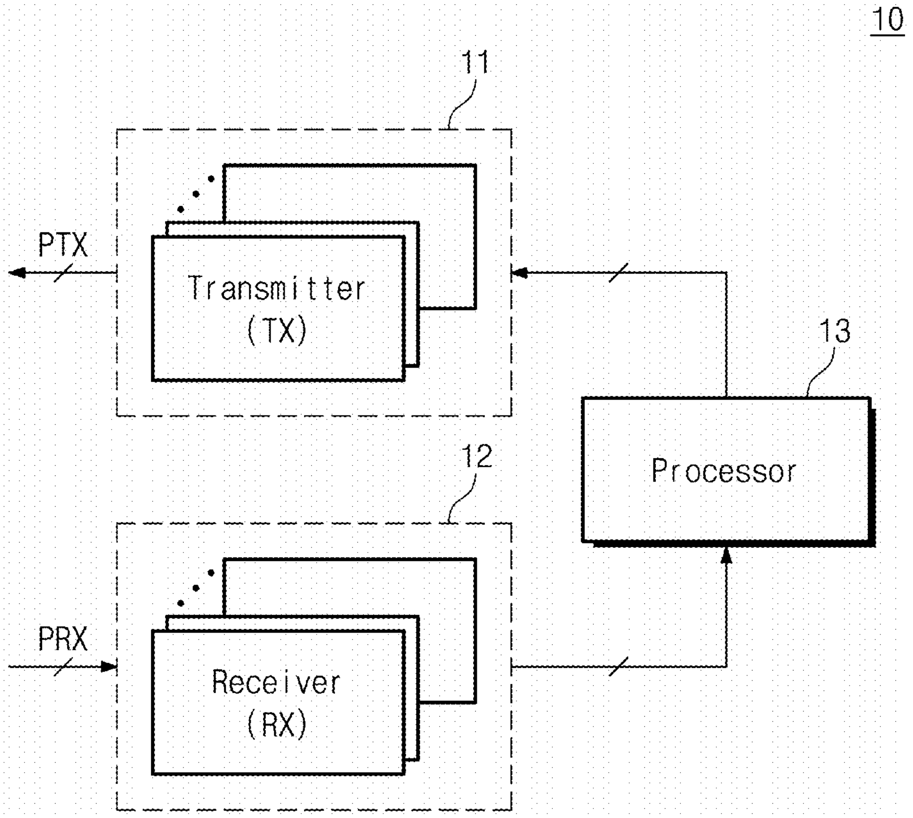
FIG. 1 is a block diagram illustrating a radar device, according to an embodiment of the present disclosure.

FIG. 1 is a block diagram illustrating a radar device, according to an embodiment of the present disclosure. Referring to FIG. 1, a radar device 10 may include a transmission unit 11, a reception unit 12, and a processor 13.

The radar device 10 may be a device configured to detect a detection target. For example, the radar device 10 may detect a detection target based on a pulse signal. The radar device 10 may be a UWB radar device. Hereinafter, the description will be made on the basis that the radar device 10 is the UWB radar device, but this is an example and the present description is not limited thereto.

The transmission unit 11 may include at least one transmitter TX. The transmitter TX may transmit (or radiate) a transmission pulse signal PTX to a detection target. For example, the transmission pulse signal PTX transmitted by the transmitter TX may be a pulse signal with a uniform period. When the transmission unit 11 includes a plurality of transmitters TX, each of the plurality of transmitters TX may transmit the different transmission pulse signal PTX.

The reception unit 12 may include at least one receiver RX. The receiver RX may receive a reflected pulse signal PRX reflected from the detection target. For example, the reflected pulse signal PRX received to the receiver RX may be a pulse signal with a uniform period. In detail, the reflected pulse signal PRX received to the receiver RX may be a pulse signal having the same period as the transmission pulse signal PTX transmitted from the transmitter TX. When the reception unit 12 includes a plurality of receivers RX, each of the plurality of receivers RX may receive the different reflected pulse signal PRX.

The processor 13 may control the overall operation of the radar device 10. In detail, the processor 13 may control the transmission of the transmission pulse signal PTX of the transmission unit 11 and the reception of the reflected pulse signal PRX of the reception unit 12.

For example, the processor 13 may transmit a control signal to the transmitter TX included in the transmission unit 11. The processor 13 may transmit different control signals to each of the plurality of transmitters TX such that each of the plurality of transmitters TX included in the transmission unit 11 transmits the different transmission pulse signals PTX. The transmitter TX may generate the transmission pulse signal PTX based on the control signal received from the processor 13 and may transmit the generated transmission pulse signal PTX to the detection target.

Additionally, the processor 13 may receive a digital signal from the receiver RX included in the reception unit 12, and may store and process the received digital signal. The processor 13 may store and analyze data on a distance, a speed, and a direction of movement of the detection target through digital signals received from each of the plurality of receivers RX included in the reception unit 12.

Figure 2:
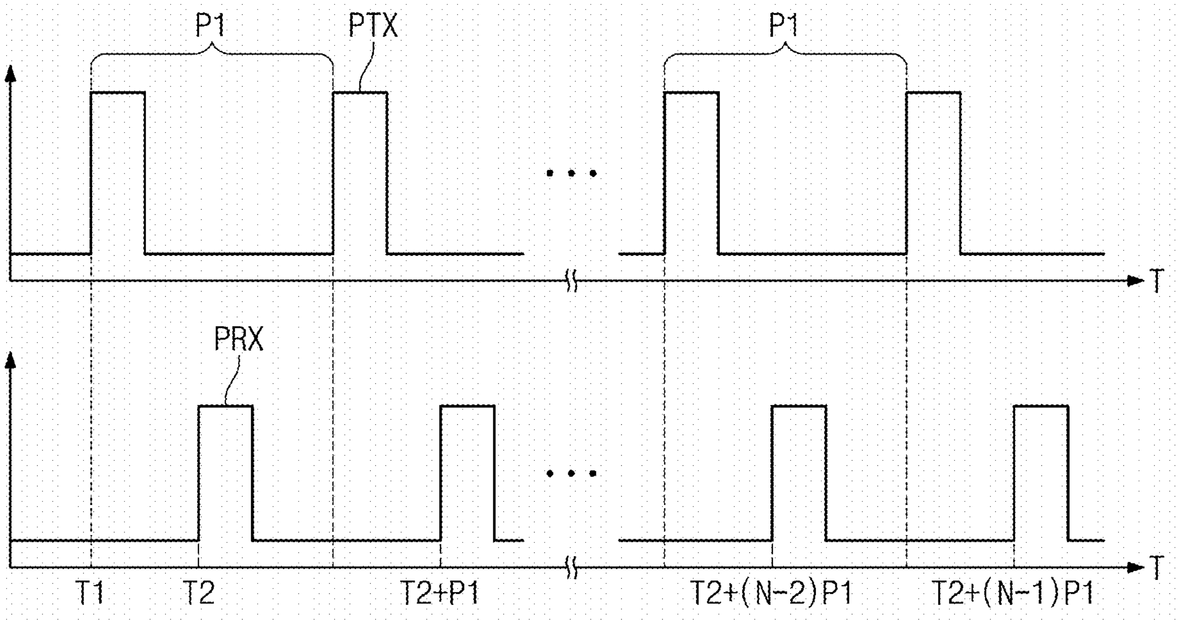
FIG. 2 is a graph illustrating a transmission pulse signal radiated by a radar device and a reflected pulse signal received by a radar device, according to an embodiment of the present disclosure.

FIG. 2 is a graph illustrating the transmission pulse signal PTX radiated by a radar device and the reflected pulse signal PRX received by a radar device, according to an embodiment of the present disclosure. A horizontal axis of a graph in FIG. 2 may indicate time "T", and a vertical axis may indicate magnitudes of the transmission pulse signal PTX or the reflected pulse signal PRX. FIG. 2 illustrates an example in which each of the transmission pulse signal PTX and the reflected pulse signal PRX has N pulses (where "N" is an arbitrary natural number).

Referring to FIG. 2, the transmitter of the radar device may transmit the transmission pulse signal PTX with a uniform period to the detection target, and the receiver of the radar device may receive the reflected pulse signal PRX with a uniform period reflected from the detection target. In this case, periods of the transmission pulse signal PTX and the reflected pulse signal PRX may be the same as a first period P1. Hereinafter, the description will be based on the fact that the reflected pulse signal PRX has N pulses.

The transmitter may radiate the transmission pulse signal PTX to the detection target at a first time T1. The transmission pulse signal PTX radiated by the transmitter TX at the first time T1 may be reflected by the detection target and may become the reflected pulse signal PRX. The receiver may receive the reflected pulse signal PRX at a second time T2. In detail, there may be a time delay from when the transmission pulse signal PTX is radiated from the transmitter until the reflected pulse signal PRX is received by the receiver. In detail, when the radar device radiates the transmission pulse signal PTX, a time delay corresponding to the time (i.e., T2−T1) obtained by subtracting the first time T1 from the second time T2 occurs, and then the radar device may receive the reflected pulse signal PRX.

Therefore, the radar device radiates each of the N pulses included in the transmission pulse signal PTX to the detection target, and then may receive each of the N pulses included in the reflected pulse signal PRX corresponding to each of the N pulses included in the transmission pulse signal PTX from the detection target, after the time delay corresponding to the time (i.e., T2−T1) obtained by subtracting the first time T1 from the second time T2 occurs.

The time delay may vary based on the sum of the distance from the transmitter to the detection target and the distance from the detection target to the receiver. In detail, when the distance from the radar device to the detection target changes, the time delay may also change. For example, as the distance from the radar device to the detection target increases, the time delay may increase, and as the distance from the radar device to the detection target becomes closer, the time delay may decrease.

In FIG. 2, the magnitudes of N pulses included in the transmission pulse signal PTX are illustrated to be the same for convenience of description, but the present disclosure is not limited thereto. In addition, in FIG. 2, the magnitudes of N pulses included in the reflected pulse signal PRX are illustrated to be the same for convenience of description, but the present disclosure is not limited thereto. For example, the magnitude of each of the N pulses included in the reflected pulse signal PRX may be different depending on the distance, the speed, and the direction of movement of the detection target. Hereinafter, for convenience of description, the magnitudes of the N pulses included in the reflected pulse signal PRX will be described on the basis that they are the same.

Figure 3:
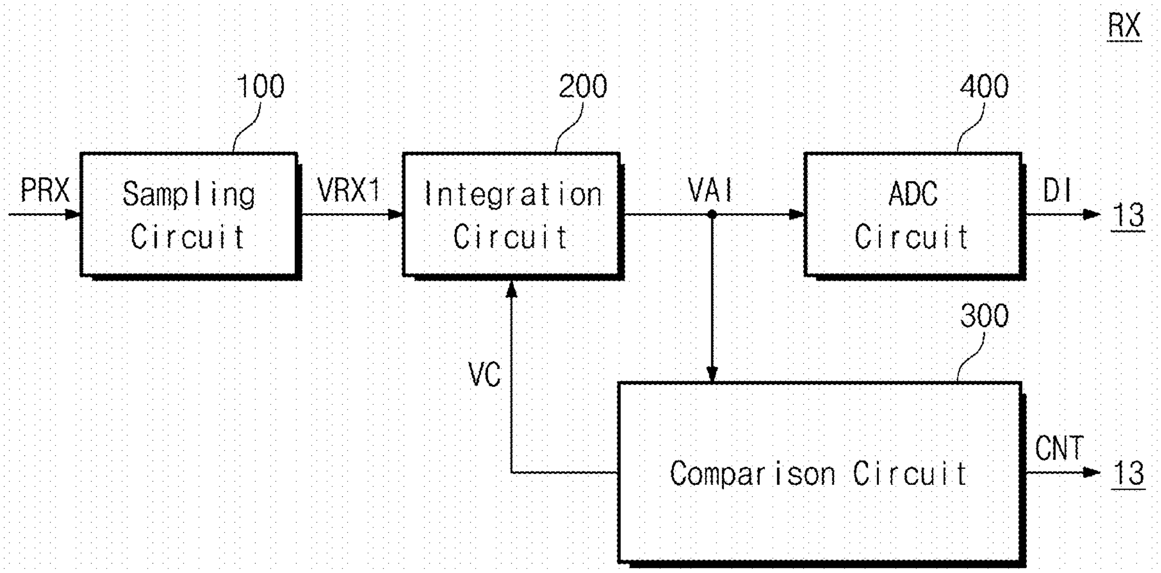
FIG. 3 is a block diagram illustrating a receiver of a radar device, according to an embodiment of the present disclosure.

FIG. 3 is a block diagram illustrating the receiver RX of a radar device, according to an embodiment of the present disclosure. Referring to FIG. 3, the receiver RX of the radar device may include a sampling circuit 100, an integration circuit 200, a comparison circuit 300, and an ADC circuit 400. Although not illustrated, the sampling circuit 100, the integration circuit 200, and the comparison circuit 300 may operate in response to a clock signal having the same period (P2 in FIG. 7) as the period (i.e., the first period P1) of the reflected pulse signal PRX received to the receiver RX.

The sampling circuit 100 may receive the reflected pulse signal PRX having the uniform period P1, which is reflected from the detection target. Additionally, the sampling circuit 100 may sample the reflected pulse signal PRX as a first received signal VRX1 in response to the clock signal. In this case, the first received signal VRX1 may include an offset voltage of the sampling circuit 100. For example, the magnitude of the first received signal VRX1 may be a magnitude of a voltage obtained by adding the offset voltage to the voltage of each of the N pulses included in the reflected pulse signal PRX.

Since the period P2 of the clock signal is the same as the period P1 of the reflected pulse signal PRX, when the sampling circuit 100 performs a sampling operation N times in response to the clock signal, the sampling circuit 100 may complete the sampling operation with respect to all N pulses included in the received reflected pulse signal PRX.

The integration circuit 200 may receive the first received signal VRX1 from the sampling circuit 100 and a control signal VC from the comparison circuit 300, in response to the clock signal. Additionally, the integration circuit 200 may generate an analog integration signal VAI based on the first received signal VRX1 and the control signal VC in response to the clock signal. In detail, the integration circuit 200 may generate the analog integration signal VAI by integrating a signal obtained by subtracting the control signal VC from the first received signal VRX1.

Since the period P2 of the clock signal is the same as the period P1 of the reflected pulse signal PRX, when the integration circuit 200 receives the first received signal VRX1 N times in response to the clock signal, the integration circuit 200 may complete a reception operation with respect to all of the first received signals VRX1 corresponding to the N pulses included in the received reflected pulse signal PRX. Likewise, when the integration circuit 200 generates the analog integration signal VAI N times in response to the clock signal, the integration circuit 200 may complete an integration operation with respect to all of the first received signals VRX1 corresponding to the N pulses included in the received reflected pulse signal PRX. When the integration circuit 200 completes the integration operation, the magnitude of the analog integration signal VAI may be less than the magnitude of the reference signal.

The comparison circuit 300 may receive the analog integration signal VAI from the integration circuit 200 in response to the clock signal. Additionally, the comparison circuit 300 may compare the analog integration signal VAI with the reference signal in response to the clock signal, and may adjust the control signal VC and a count value CNT based on the comparison result. In this case, before the receiver RX receives the reflected pulse signal PRX, the control signal VC may have an initialization value, and the count value CNT may have an initial value of “0”. For example, the initialization value may be “0”. For example, when the analog integration signal VAI is less than the reference signal, the comparison circuit 300 may maintain the count value CNT and may initialize the control signal VC. As another example, when the analog integration signal VAI is greater than or equal to the reference signal, the comparison circuit 300 may adjust the count value CNT to increase and may adjust the control signal VC to the reference signal. For example, the count value CNT may be a digital signal of M bits (where “M” is an arbitrary natural number).

Since the period P2 of the clock signal is the same as the period P1 of the reflected pulse signal PRX, each time the integration circuit 200 performs an integration operation in response to the clock signal, the comparison circuit 300 may perform a comparison operation of the analog integration signal VAI with the reference signal. After the integration circuit 200 completes the integration operation with respect to all of the first received signals VRX1 corresponding to the N pulses included in the reflected pulse signal PRX, the comparison circuit 300 may output the adjusted count value CNT to the processor 13.

The ADC circuit 400 may receive the analog integration signal VAI from the integration circuit 200. Additionally, the ADC circuit 400 may convert the received analog integration signal VAI into a digital integration signal DI. For example, the digital integration signal DI may be a digital signal of L bits (where “L” is an arbitrary natural number). In detail, after the integration circuit 200 completes the integration operation with respect to all of the first received signals VRX1 corresponding to the N pulses included in the reflected pulse signal PRX, the ADC circuit 400 may convert the analog integration signal VAI into the digital integration signal DI. In addition, the ADC circuit 400 may output the converted digital integration signal DI to the processor 13.

As described above, the first received signal VRX1 may include an offset voltage. Therefore, when the integration circuit 200 integrates the signal obtained by subtracting the control signal VC from the first received signal VRX1 in response to the clock signal, the offset voltage may be included in the analog integration signal VAI. For example, when the integration circuit 200 performs an integration operation in response to the clock signal, the offset voltage included in the first received signal VRX1 may be included in the analog integration signal VAI.

When the control signal VC is an initialization value, and when the integration circuit 200 performs the integration operation in response to the clock signal, the magnitude of the analog integration signal VAI may increase by the magnitude of the first received signal VRX1. The analog integration signal VAI increases as the integration operation of the integration circuit 200 is repeated, and the increased analog integration signal VAI may be greater than or equal to the reference signal. When the analog integration signal VAI is greater than or equal to the reference signal, the control signal VC may be the reference signal.

When the control signal VC is the reference signal, the integration circuit 200 may integrate a signal obtained by subtracting the reference signal from the first received signal VRX1. Accordingly, through the integration operation of the integration circuit 200, the magnitude of the analog integration signal VAI may be reduced by the magnitude of the signal obtained by subtracting the first received signal VRX1 from the reference signal. The magnitude of the analog integration signal VAI may be maintained to be less than the magnitude of the reference signal by the control signal VC received from the comparison circuit 300. Accordingly, the analog integration signal VAI output by the integration circuit 200 may not be saturated. In addition, the number of integration operations of the integration circuit 200 may not be limited.

Figure 4:
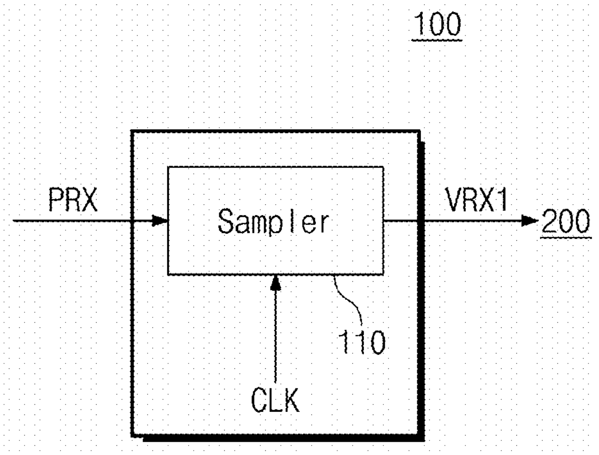
FIG. 4 is a block diagram illustrating a sampling circuit, according to an embodiment of the present disclosure.

FIG. 4 is a block diagram illustrating a sampling circuit, according to an embodiment of the present disclosure. Referring to FIG. 4, the sampling circuit 100 may include a sampler 110 that operates in response to a clock signal CLK.

The sampler 110 may receive the reflected pulse signal PRX reflected from the detection target. In addition, the sampler 110 may sample the received reflected pulse signal PRX as the first received signal VRX1 in response to the clock signal CLK. The sampler 110 may transmit the sampled first received signal VRX1 to the integration circuit 200. In this case, the period P2 of the clock signal CLK may be the same as the period P1 of the reflected pulse signal PRX.

An offset voltage may be occurred while the sampler 110 samples the reflected pulse signal PRX as the first received signal VRX1. In detail, the first received signal VRX1 may include the offset voltage of the sampler 110. A more detailed description of the magnitude of the first received signal VRX1 will be described later with reference to FIG. 7.

Figure 5:
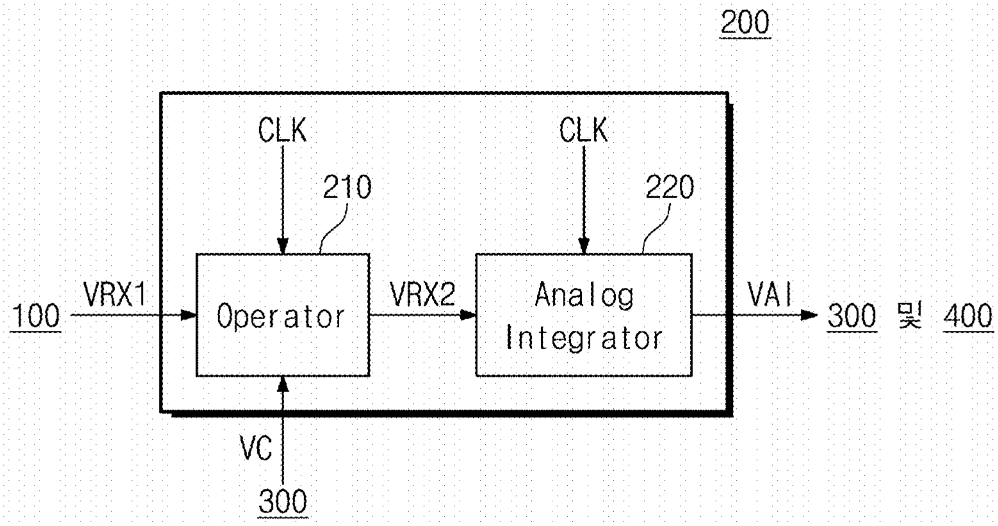
FIG. 5 is a block diagram illustrating an integration circuit, according to an embodiment of the present disclosure.

FIG. 5 is a block diagram illustrating the integration circuit 200, according to an embodiment of the present disclosure. Referring to FIG. 5, the integration circuit 200 may include an operator 210 that operates in response to the clock signal CLK and an analog integrator 220 that operates in response to the clock signal CLK.

The operator 210 may receive the first received signal VRX1 from the sampling circuit 100 and the control signal VC from the comparison circuit 300. The operator 210 may generate a second received signal VRX2 based on the first received signal VRX1 and the control signal VC in response to the clock signal CLK. In detail, the operator 210 may generate a signal obtained by subtracting the control signal VC from the first received signal VRX1 as the second received signal VRX2. In detail, the operator 210 may perform an operation to subtract the control signal VC from the first received signal VRX1 and may generate the second received signal VRX2 corresponding to the operation result.

When the control signal VC is an initialization value, the second received signal VRX2 may be the same as the first received signal VRX1. In addition, when the control signal VC is the reference signal, the second received signal VRX2 may be a signal obtained by subtracting the reference signal from the first received signal VRX1. In this case, the magnitude of the reference signal may be greater than the magnitude of the first received signal VRX1. Accordingly, when the control signal VC is a reference signal, the second received signal VRX2 may have a negative value. The operator 210 may transmit the second received signal VRX2 to the analog integrator 220.

The analog integrator 220 may receive the second received signal VRX2 from the operator 210. The analog integrator 220 may generate the analog integration signal VAI based on the second received signal VRX2 in response to the clock signal CLK. In detail, the analog integrator 220 may generate the analog integration signal VAI by integrating the second received signal VRX2. The analog integrator 220 may transmit the generated analog integration signal VAI to the comparison circuit 300 and the ADC circuit 400. In this case, the period P2 of the clock signal CLK may be the same as the period P1 of the reflected pulse signal PRX.

When the second received signal VRX2 is the same as the first received signal VRX1, that is, when the control signal VC is the initialization value, the analog integrator 220 may integrate the first received signal VRX1 to the analog integration signal VAI generated at the previous clock signal CLK. Accordingly, the analog integration signal VAI may be a signal obtained by adding the first received signal VRX1 to the analog integration signal VAI generated at the previous clock signal CLK.

When the second received signal VRX2 is a signal obtained by subtracting the reference signal from the first received signal VRX1, that is, when the control signal VC is the reference signal, the analog integration signal VAI may be a signal obtained by adding the first received signal VRX1 to the analog integration signal VAI generated at the previous clock signal CLK and then by subtracting the reference signal from the addition result.

Figure 6:
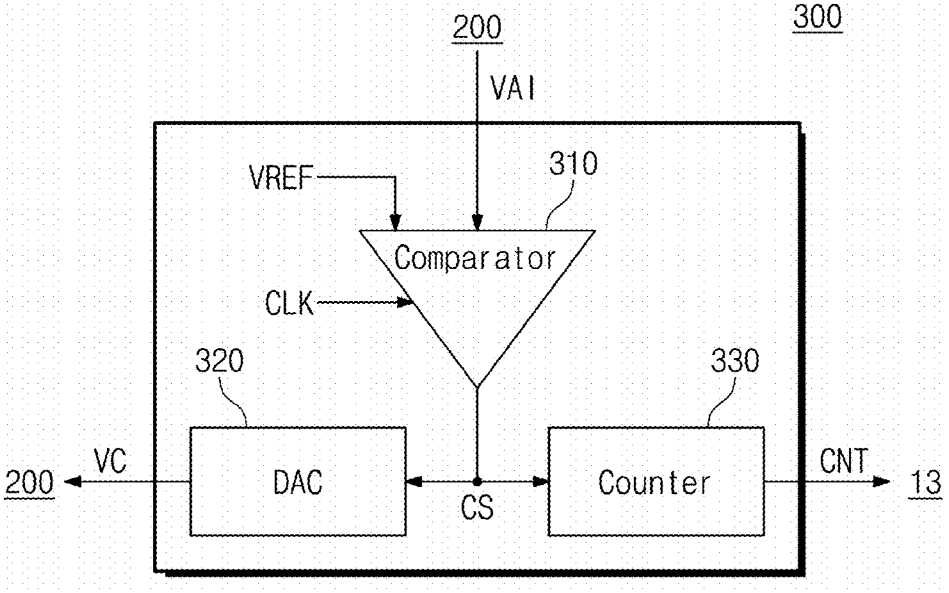
FIG. 6 is a block diagram illustrating a comparison circuit, according to an embodiment of the present disclosure.

FIG. 6 is a block diagram illustrating the comparison circuit 300, according to an embodiment of the present disclosure. Referring to FIG. 6, the comparison circuit 300 may include a comparator 310 that operates in response to the clock signal CLK, a DAC 320, and a counter 330.

The comparator 310 may receive the analog integration signal VAI from the integration circuit 200. The comparator 310 may compare the magnitude of the analog integration signal VAI with the magnitude of a reference signal VREF in response to the clock signal CLK. The comparator 310 may generate a comparison signal CS based on the comparison result. For example, when the magnitude of the analog integration signal VAI is less than the magnitude of the reference signal VREF, the comparison signal CS may be a logical low (or logic "0"). As another example, when the magnitude of the analog integration signal VAI is greater than or equal to the magnitude of the reference signal VREF, the comparison signal CS may be a logical high (or logic "1"). The comparator 310 may output the comparison signal CS to the DAC 320 and the counter 330. In this case, the period P2 of the clock signal CLK may be the same as the period P1 of the reflected pulse signal (PRX in FIG. 2).

The DAC 320 may receive the comparison signal CS from the comparator 310. The DAC 320 may adjust the control signal VC based on the received comparison signal CS. For example, when the comparison signal CS is the logical low (or logic "0"), the DAC 320 may initialize the control signal VC. As another example, when the comparison signal CS is the logical high (or logic "1"), the DAC 320 may adjust the control signal VC to the reference signal VREF. The DAC 320 may output the control signal VC to the integration circuit 200.

The counter 330 may receive the comparison signal CS from the comparator 310. The counter 330 may adjust the count value CNT based on the comparison signal CS. For example, when the comparison signal CS is the logical low (or logic "0"), the counter 330 may maintain the count value CNT. In detail, the counter 330 may maintain the count value CNT such that the count value CNT is not adjusted from the count value CNT at the previous clock signal CLK. As another example, when the comparison signal CS is the logical high (or logic "1"), the counter 330 may adjust the count value CNT to increase.

Referring to FIGS. 4, 5, and 6, with respect to all N pulses included in the reflected pulse signal PRX in response to the clock signal CLK N times, the sampling circuit 100 may perform the sampling operation, the integration circuit 200 may perform the integration operation, and the comparison circuit 300 may perform the comparison operation. Next, the counter 330 may output the final adjusted count value CNT to the processor 13 as a result of responding to the clock signal CLK N times.

Referring to FIGS. 3 and 6, with respect to all N pulses included in the reflected pulse signal PRX in response to the clock signal CLK N times, the sampling circuit 100 may perform the sampling operation, the integration circuit 200 may perform the integration operation, and the comparison circuit 300 may perform the comparison operation. Next, the ADC circuit 400 may convert the analog integration signal VAI finally generated as a result of responding to the clock signal CLK N times into the digital integration signal DI.

Figure 7:
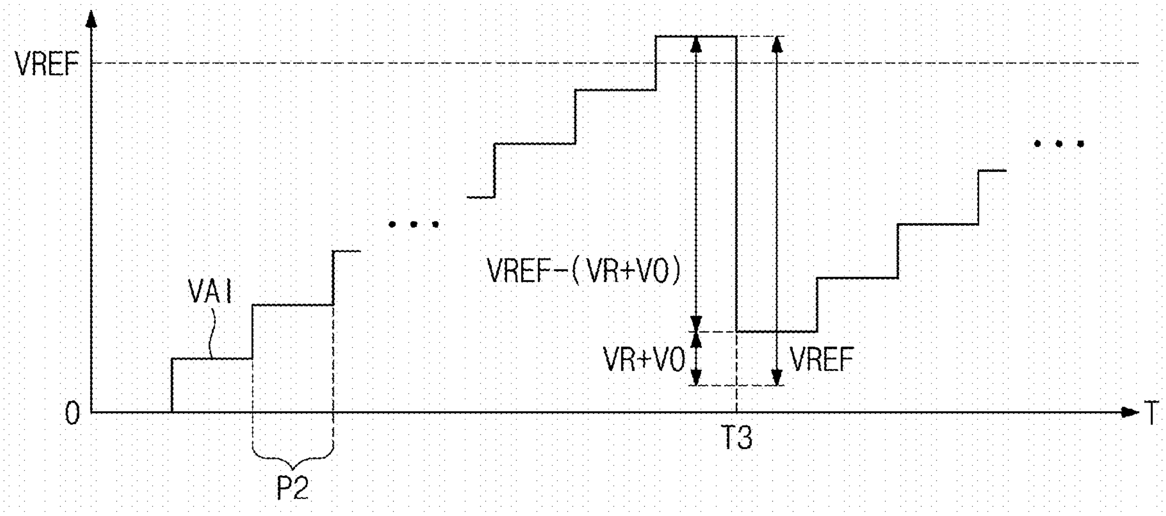
FIG. 7 is a graph illustrating an example of an analog integration signal, according to an embodiment of the present disclosure.

FIG. 7 is a graph illustrating an example of an analog integration signal, according to an embodiment of the present disclosure. FIG. 7 illustrates a graph as an example for convenience of understanding the characteristic in which the magnitude of the analog integration signal VAI is maintained to be less than the magnitude of the reference signal VREF. A horizontal axis of the graph in FIG. 7 may indicate time "T", and a vertical axis may indicate the magnitude of the analog integration signal VAI.

Referring to FIG. 7, the magnitude of the analog integration signal VAI may increase by the magnitude of the first received signal (VRX1 of FIG. 3) every one period P2 of the clock signal (CLK in FIGS. 4, 5, and 6) in a section before a third time T3. For example, the magnitude of the first received signal may be a value (i.e., VR+VO) obtained by adding an offset voltage VO to the magnitude (hereinafter referred to as reflected pulse voltage VR) of each of the N pulses included in the reflected pulse signal (PRX in FIG. 2). In FIG. 7, the magnitudes VR of N pulses included in the reflected pulse signal (PRX in FIG. 2) are illustrated to be the same. However, this is an example and the present description is not limited thereto.

The magnitude of the analog integration signal VAI may increase by the value (i.e., VR+VO) obtained by adding the offset voltage VO to the reflected pulse voltage VR every one period P2 of the clock signal in the section before the third time T3. In detail, in the section before the third time T3, when the period P2 of the clock signal transitions C times (where "C" is an arbitrary natural number), the magnitude of the analog integration signal VAI may be C. (VR+VO).

As a result of repeatedly increasing the magnitude of the analog integration signal VAI until the third time T3, the magnitude of the analog integration signal VAI may be greater than the magnitude of the reference signal VREF at the third time T3. Referring to FIGS. 3 and 7, at the third time T3, the comparison circuit may adjust the control signal VC to the reference signal VREF. Therefore, the integration circuit may integrate the signal (i.e., (VR+VO)−VREF) obtained by subtracting the reference signal VREF from the first received signal in response to the clock signal after the third time T3 elapses. The magnitude of the analog integration signal VAI after the third time T3 elapses may be a value obtained by adding the reflected pulse voltage VR and the offset voltage VO to the magnitude of the analog integration signal VAI before the third time T3 and then by subtracting the magnitude of the reference signal VREF from the addition result. Referring to FIGS. 3, 6, and 7, the counter 330 may adjust the count value CNT to increase in response to the clock signal after the third time T3 elapses.

In an embodiment of the present disclosure, when the count value CNT is adjusted to increase, the increase magnitude may be "1". Therefore, while the period P2 of the clock signal transitions as many times as the number of pulses included in the reflected pulse signal, that is, N times, when the number of times that the magnitude of the analog integration signal VAI becomes greater than or equal to the magnitude of the reference signal VREF is k times (where "k" is an arbitrary integer greater than "0"), the count value CNT output by the counter 330 of FIG. 6 to the processor 13 may be "k". In addition, after the period P2 of the clock signal transitions N times, the magnitude of the analog integration signal VAI may be less than the reference signal VREF. For example, the magnitude of the analog integration signal VAI may be a value obtained by subtracting k times (i.e., k·VREF) the magnitude of the reference signal VREF from N times (i.e., N·(VR+VO) the sum of the reflected pulse voltage VR and the offset voltage VO. In detail, the magnitude of the final analog integration signal VAI may be the value of $\{N\cdot(VR+VO)\}-k\cdot VREF$. The ADC circuit (400 of FIG. 3) may output the digital integration signal (DI of FIG. 3) obtained by converting the final analog integration signal VAI into the digital signal to the processor 13. In the above description, when the count value CNT is adjusted to increase, the increasing magnitude is described as "1", but this is an example and the present description is not limited thereto.

Figure 8:
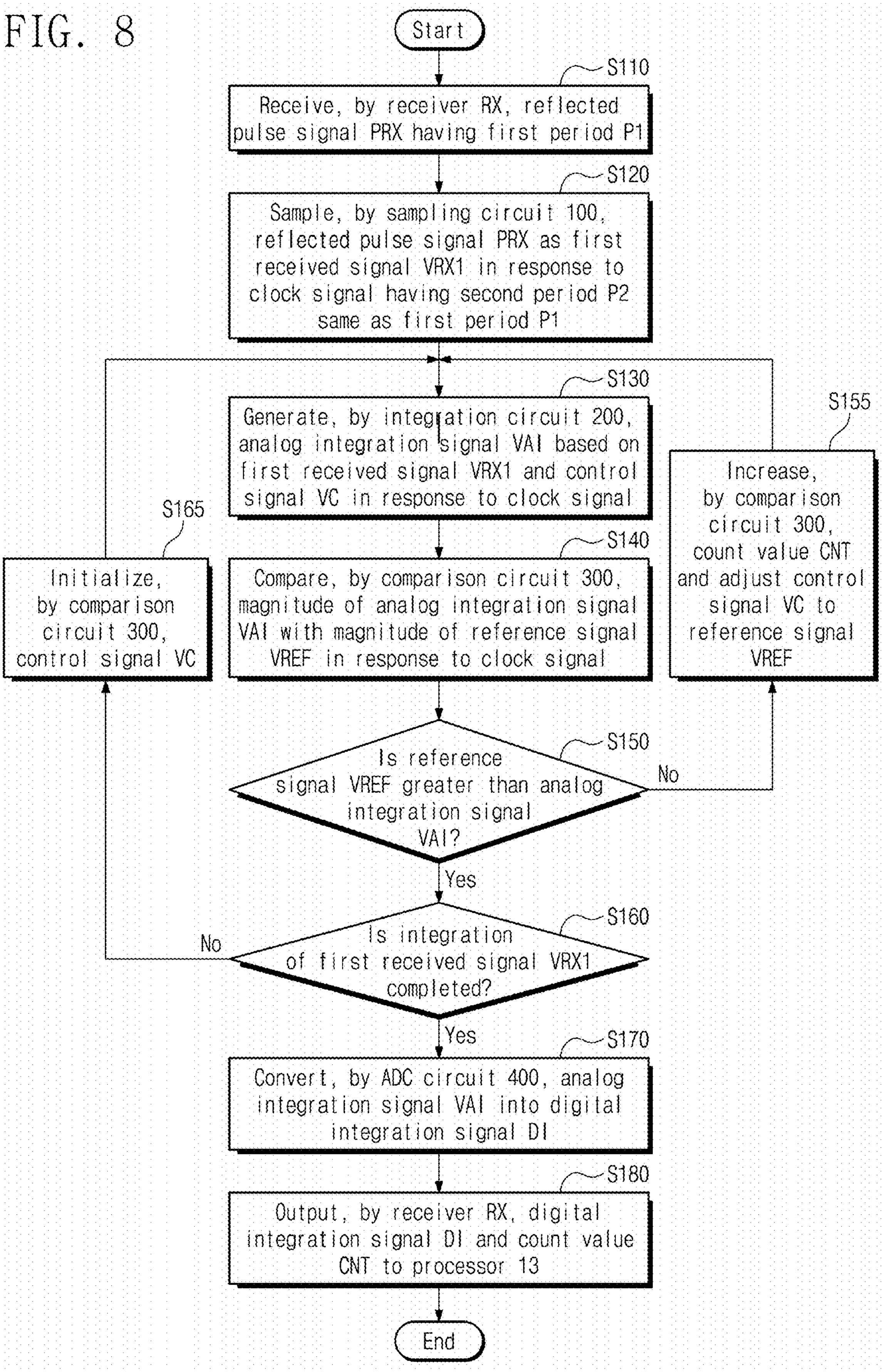
FIG. 8 illustrates an example of a method operating a receiver of a radar device, according to an embodiment of the present disclosure.

FIG. 8 illustrates an example of a method operating a receiver of a radar device, according to an embodiment of the present disclosure. Referring to FIG. 8, in operation S110, the receiver RX may receive the reflected pulse signal PRX, which has the uniform period P1, and is reflected from the detection target.

In operation S120, the sampling circuit 100 may sample the reflected pulse signal PRX as the first received signal VRX1 in response to the clock signal CLK having the same period P2 as the period (i.e., the first period P1) of the reflected pulse signal PRX.

In operation S130, the integration circuit 200 may generate the analog integration signal VAI based on the first received signal VRX1 and the control signal VC in response to the clock signal CLK.

In operation S140, the comparison circuit 300 may compare the magnitude of the analog integration signal VAI with the magnitude of the reference signal VREF in response to the clock signal CLK.

In operation S150, as a result of the comparison of the comparison circuit 300, when the magnitude of the analog integration signal VAI is greater than or equal to the magnitude of the reference signal VREF, the receiver RX of the radar device may return to operation S130 through operation S155, and may repeat the above-described process. When the magnitude of the analog integration signal VAI is less than the magnitude of the reference signal VREF, the receiver RX of the radar device may proceed to operation S160 and may continue the operation.

In operation S155, the comparison circuit 300 may adjust the control signal VC to the reference signal VREF and may adjust the count value CNT to increase.

In operation S160, the receiver RX of the radar device may determine whether the integration operation with respect to all of the first received signals VRX1 corresponding to each of the N pulses included in the reflected pulse signal PRX is completed. When the integration operation is not completed, the receiver RX of the radar device may return to operation S130 through operation S165 and may repeat the above-described process. When the integration operation is completed, the receiver RX of the radar device may proceed to operation S170 and may continue an operation.

In operation S165, the comparison circuit 300 may initialize the control signal VC and may maintain the count value CNT.

In operation S170, the ADC circuit 400 may convert the analog integration signal VAI into the digital integration signal DI.

In operation S180, the receiver RX of the radar device may output the count value CNT and the digital integration signal DI to the processor 13.

Figure 9A:
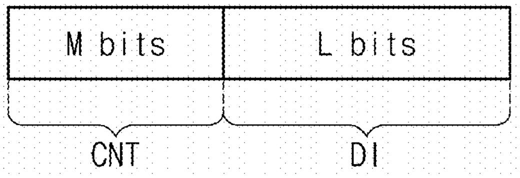
FIGS. 9A and 9B illustrate examples of digital signals received by a processor of a radar device, according to an embodiment of the present disclosure.
Figure 9B:
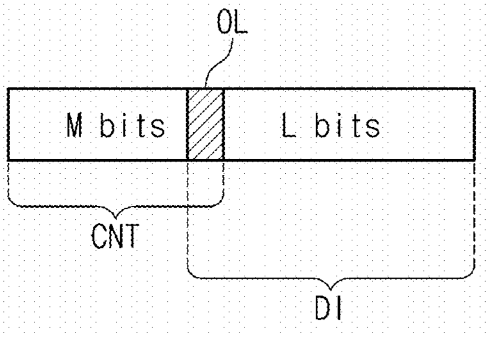

FIGS. 9A and 9B illustrate examples of digital signals received by a processor of a radar device, according to an embodiment of the present disclosure. Referring to FIGS. 9A and 9B, the digital signal received by the processor may include the count value CNT and the digital integration signal DI.

Referring to FIGS. 3, 9A, and 9B, the processor 13 may receive the count value CNT from the comparison circuit 300 of the receiver RX of the radar device, and may receive the digital integration signal DI from the ADC circuit 400. For example, the count value CNT may be an M-bit digital signal, and the digital integration signal DI may be an L-bit digital signal.

Referring to FIG. 9A, the processor may place the count value CNT, which is the M-bit digital signal, in the MSB, and the digital integration signal DI, which is the L-bit digital signal, in the LSB, thereby obtaining a voltage corresponding to the reflected pulse signal that is received by the receiver of the radar device. In detail, the processor may obtain the voltage corresponding to the reflected pulse signal by processing the digital signal of M+L bits.

Referring to FIG. 9B, the processor may overlap OL some of the M-bit digital signal corresponding to the count value CNT and some of the L-bit digital signal corresponding to the digital integration signal DI to obtain the voltage corresponding to the reflected pulse signal that is received by the receiver of the radar device. In detail, the processor may obtain a voltage corresponding to the reflected pulse signal by applying the 0.5 bit overlap technique. In detail, the processor may obtain a voltage corresponding to the reflected pulse signal by processing a (M+L)−1 bit digital signal.

Referring to FIGS. 3 and 9B, when the 0.5 bit overlap technique is used, the processor 13 may prevent data errors due to errors in the operation of the comparison circuit 300 of FIG. 3. In addition, when the ADC circuit 400 of FIG. 3 is a pipeline ADC circuit, the 0.5 bit overlap technique may prevent errors between stages of the pipeline ADC circuit.

According to an embodiment of the present disclosure, the receiver of the UWB radar is provided that reduces the output of the analog integrator by the reference value when the output of the analog integrator becomes greater than the reference value, thereby always maintaining the output of the analog integrator to be less than the reference value. Accordingly, the receiver of the UWB radar is provided that improves the issues in which the output of the analog integrator is not saturated and the number of integrations of the analog integrator is limited.

The above descriptions are detail embodiments for carrying out the present disclosure. Embodiments in which a design is changed simply or which are easily changed may be included in the present disclosure as well as an embodiment described above. In addition, technologies that are easily changed and implemented by using the above embodiments may be included in the present disclosure. Therefore, the scope of the present disclosure should not be limited to the above-described embodiments and should be defined by not only the claims to be described later, but also those equivalent to the claims of the present disclosure.

What is claimed is:

1. A receiver of a radar device comprising:

a sampling circuit configured to receive a reflected pulse signal having a first period reflected from a detection target, and to sample the reflected pulse signal as a first received signal in response to a clock signal having a second period equal to the first period;

an integration circuit configured to, in response to the clock signal, generate an analog integration signal based on the first received signal and a control signal;

a comparison circuit configured to, in response to the clock signal, adjust a count value and the control signal based on a result of comparing the analog integration signal with a reference signal, and output the control signal to the integration circuit; and an ADC circuit configured to convert the analog integration signal into a digital integration signal.

2. The receiver of the radar device of claim 1, wherein, when the analog integration signal is less than the reference signal, the comparison circuit is configured to maintain the count value, and to initialize the control signal, and wherein, when the analog integration signal is greater than or equal to the reference signal, the comparison circuit is configured to adjust the count value to increase and to adjust the control signal to the reference signal.

3. The receiver of the radar device of claim 2, wherein the comparison circuit includes:

a comparator configured to generate a comparison signal by comparing the analog integration signal with the reference signal in response to the clock signal;

a DAC configured to adjust the control signal based on the comparison signal; and a counter configured to adjust the count value based on the comparison signal.

4. The receiver of the radar device of claim 3, wherein, when the analog integration signal is less than the reference signal, the comparator is configured to generate the comparison signal with a value of logical low (or logic "0"), and when the analog integration signal is greater than or equal to the reference signal, the comparator is configured to generate the comparison signal with a value of logical high (or logic "1").

5. The receiver of the radar device of claim 4, wherein the counter is configured to maintain the count value when the comparison signal is the logical low, and to adjust to increase the count value when the comparison signal is the logical high.

6. The receiver of the radar device of claim 5, wherein the DAC is configured to initialize the control signal when the comparison signal is the logical low, and to adjust the control signal to the reference signal when the comparison signal is the logical high.

7. The receiver of the radar device of claim 1, wherein the integration circuit is configured to generate the analog integration signal by integrating a signal obtained by subtracting the control signal from the first received signal.

8. The receiver of the radar device of claim 7, wherein the integration circuit includes:

an operator configured to generate a second received signal obtained by subtracting the control signal from the first received signal in response to the clock signal; and an analog integrator configured to generate the analog integration signal by integrating the second received signal in response to the clock signal.

9. The receiver of the radar device of claim 1, wherein the count value is implemented as an M-bit digital signal, and the analog integration signal is implemented as an L-bit digital signal, wherein each of the "M" and the "L" is an arbitrary integer greater than or equal to "0", and wherein the comparison circuit and the ADC circuit are configured to output the count value and the digital integration signal to a processor, respectively.

10. The receiver of the radar device of claim 9, wherein the processor is configured to place the count value in an MSB and to place the analog integration signal in a LSB to obtain a voltage corresponding to the reflected pulse signal.

11. The receiver of the radar device of claim 10, wherein the processor is configured to obtain the voltage corresponding to the reflected pulse signal based on a 0.5 bit overlap technique.

12. A method of operating a receiver of a radar device, comprising:

receiving, by the receiver of the radar device, a reflected pulse signal having a first period from an outside;

sampling, by a sampling circuit, the reflected pulse signal as a first received signal in response to a clock signal having a second period equal to the first period;

generating, by an integration circuit, an analog integration signal based on the first received signal and a control signal, in response to the clock signal;

comparing, by a comparison circuit, a magnitude of the analog integration signal with a magnitude of a reference signal, in response to the clock signal;

adjusting, by the comparison circuit, a count value and the control signal based on a result of comparing the magnitude of the analog integration signal with the magnitude of the reference signal; and converting, by an ADC circuit, the analog integration signal into a digital integration signal.

13. The method of claim 12, wherein the adjusting of the count value and the control signal includes maintaining the count value and adjusting the control signal to "0" when the analog integration signal is less than the reference signal, and adjusting the count value to increase by "1" and adjusting the control signal to the reference signal when the analog integration signal is greater than or equal to the reference signal.

14. The method of claim 13, wherein the comparing of the magnitude of the analog integration signal with the magnitude of the reference signal includes:

generating, by a comparator, a comparison signal by comparing the analog integration signal with the reference signal in response to the clock signal;

adjusting, by a DAC, the control signal based on the comparison signal; and adjusting, by a counter, the count value based on the comparison signal.

15. The method of claim 14, wherein the adjusting of the count value and the control signal further includes generating, by the comparator, the comparison signal with a value of logical low (or logic "0") when the analog integration signal is less than the reference signal, and generating, by the comparator, the comparison signal with a value of logical high (or logic "1") when the analog integration signal is greater than or equal to the reference signal.

16. The method of claim 15, wherein the adjusting of the count value includes maintaining the count value when the comparison signal is the logical low, and adjusting the count value to increase by "1" when the comparison signal is the logical high.

17. The method of claim 16, wherein the adjusting of, by the DAC, the control signal based on the comparison signal includes adjusting the control signal to "0" when the comparison signal is the logical low, and adjusting the control signal to the reference signal when the comparison signal is the logical high.

18. The method of claim 12, wherein the generating of the analog integration signal includes integrating a signal obtained by subtracting the control signal from the first received signal.

19. The method of claim 18, wherein the generating of the analog integration signal includes:

generating, by an operator, a second received signal obtained by subtracting the control signal from the first received signal in response to the clock signal; and generating, by an analog integrator, the analog integration signal by integrating the second received signal in response to the clock signal.

20. A radar device comprising:

a receiver configured to receive a reflected pulse signal having a first period reflected from a detection target; and a processor configured to control the receiver and to receive data associated with the detection target from the receiver, wherein the receiver includes:

a sampling circuit configured to sample the reflected pulse signal as a first received signal in response to a clock signal having a second period equal to the first period;

an integration circuit configured to, in response to the clock signal, generate an analog integration signal based on the first received signal and a control signal;

a comparison circuit configured to, in response to the clock signal, adjust a count value and the control signal based on a result of comparing the analog integration signal with a reference signal, output the control signal to the integration circuit, and output the count value to the processor; and an ADC circuit configured to convert the analog integration signal into a digital integration signal, and to output the digital integration signal to the processor, wherein the count value is implemented as an M-bit digital signal, and the analog integration signal is implemented as an L-bit digital signal, wherein each of the "M" and the "L" is an arbitrary integer greater than or equal to "0", and wherein the processor is configured to place the count value in an MSB and to place the analog integration signal in a LSB to obtain a voltage corresponding to the reflected pulse signal.

* * * * *